United States Patent
Narendra et al.

(10) Patent No.: US 7,444,528 B2
(45) Date of Patent: Oct. 28, 2008

(54) COMPONENT RELIABILITY BUDGETING SYSTEM

(75) Inventors: Siva G. Narendra, Portland, OR (US);
James W. Tschanz, Portland, OR (US);
Vivek K. De, Beaverton, OR (US);
Stephen H. Tang, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 11/295,400

(22) Filed: Dec. 6, 2005

(65) Prior Publication Data

US 2007/0130485 A1   Jun. 7, 2007

(51) Int. Cl.
*G06F 1/26* (2006.01)
*G06F 1/00* (2006.01)

(52) U.S. Cl. .................... 713/320; 713/300
(58) Field of Classification Search .......... 713/320, 713/300
See application file for complete search history.

(56) References Cited

U.S. PATENT DOCUMENTS

| 6,967,522 B2* | 11/2005 | Chandrakasan et al. ..... 327/534 |
| 6,996,441 B1* | 2/2006 | Tobias ........................ 700/44 |
| 7,111,179 B1* | 9/2006 | Girson et al. ................. 713/300 |
| 7,243,254 B1* | 7/2007 | Kuroodi et al. ............. 713/600 |
| 2006/0080062 A1* | 4/2006 | Bose et al. ................... 702/186 |

* cited by examiner

*Primary Examiner*—Rehana Perveen
*Assistant Examiner*—Stefan Stoynov
(74) *Attorney, Agent, or Firm*—Buckley, Maschoff & Talwalkar LLC (57) ABSTRACT

A system may include acquisition of a supply voltage information representing past supply voltages supplied to an electrical component, acquisition of a temperature information representing past temperatures of the electrical component, and control of a performance characteristic of the electrical component based on the supply voltage information and the temperature information. Some embodiments may further include determination of a reliability margin based on the supply voltage information, the temperature information, and on a reliability specification of the electrical component, and change of the performance characteristic based on the reliability margin.

24 Claims, 9 Drawing Sheets

COMPONENT RELIABILITY BUDGETING SYSTEM

BACKGROUND

Electrical components are commonly designed in view of a worst-case operational scenario. For example, a microprocessor may be designed to reliably operate for a particular "operational lifetime" at a maximum supply voltage ($V_{max}$) and a maximum allowed temperature ($T_{max}$). Most microprocessors do not, however, continuously operate at $V_{max}$ or $T_{max}$. Accordingly, such a microprocessor might reliably operate for a period greater than its specified operational lifetime at the expense of improved performance during its operational lifetime.

DETAILED DESCRIPTION

Figure 1:
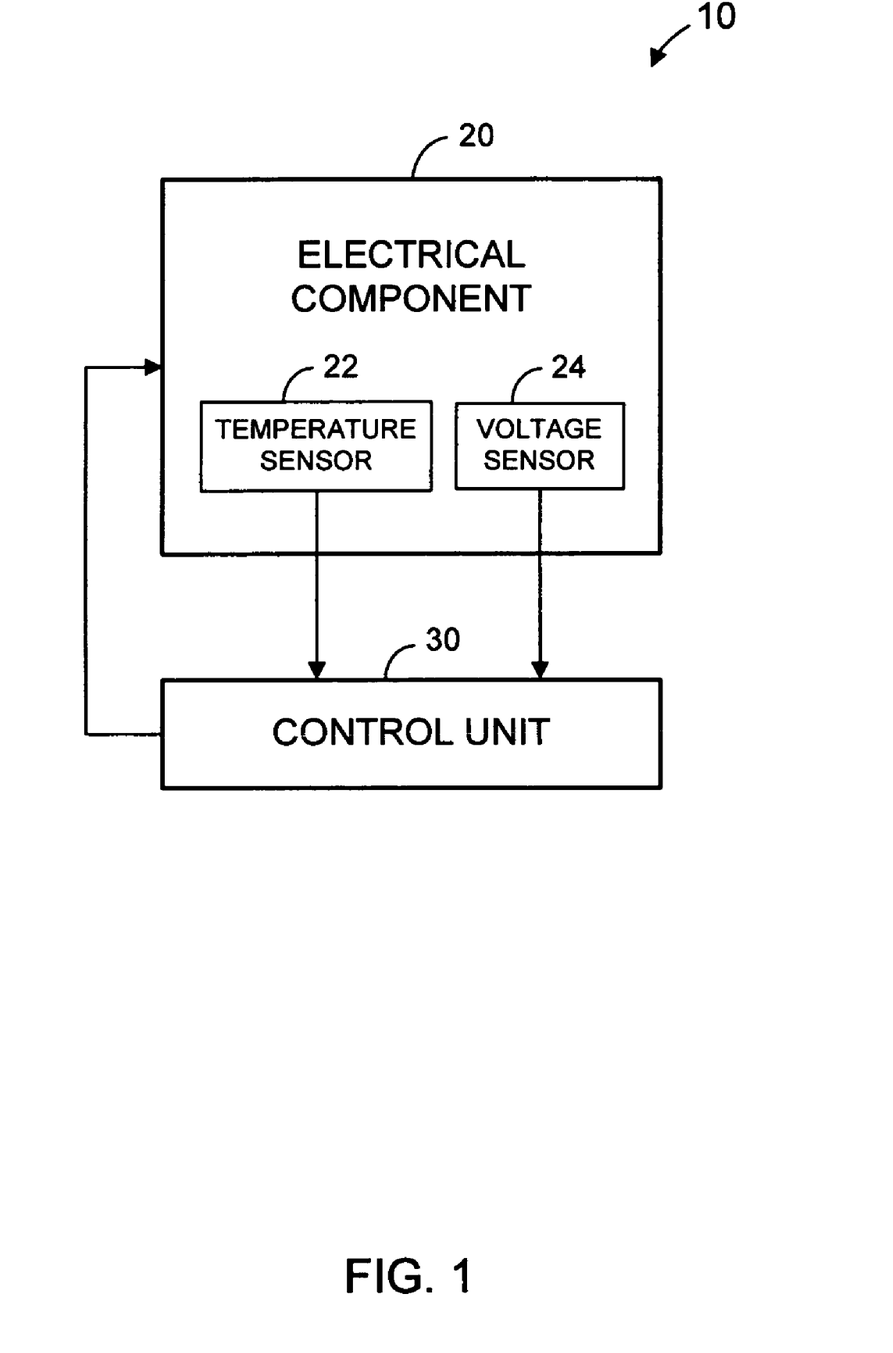
FIG. 1 is a block diagram of an apparatus according to some embodiments.

FIG. 1 is a block diagram of an apparatus according to some embodiments. Apparatus 10 includes electrical component 20 and control unit 30. Apparatus 10 may comprise a portion of a computing platform (e.g., a desktop platform or a server platform). According to some embodiments, control unit 30 operates to change a performance characteristic of electrical component 20 based on a plurality of supply voltages and temperatures. In this regard, electrical component 20 includes temperature sensor 22 and voltage sensor 24. The performance characteristic may, in some embodiments, include one or more of a frequency of operation, a supply voltage, or a workload.

Electrical component 20 may comprise any suitable electrical component or components, including but not limited to a microprocessor, a controller, a memory, any other integrated circuit, and any electrical device that operates based on a supply voltage. Temperature sensor 22 determines a plurality of temperatures of electrical component 20. Two or more of the plurality of temperatures may be determined at different points of time. Accordingly, temperature sensor 22 may, in some embodiments, determine a history of past temperatures of component 20. Temperature sensor 22 may comprise several sensors to determine temperatures at different locations of component 20.

Temperature sensor 22 may comprise any currently- or hereafter-known system to determine the plurality of temperatures, Voltage sensor 24 may determine a plurality of supply voltages supplied to electrical component 20. As described with respect to temperature sensor 22, two or more of the plurality of supply voltages may be determined at different points of time, thereby determining a history of past supply voltages supplied to component 20. Both voltage sensor 24 and temperature sensor 22 may comprise any system for determining a supply voltage and a temperature, respectively, that is or becomes known, including systems that do not directly detect voltage or temperature.

Control unit 30 acquires supply voltage information representing past supply voltages of electrical component 20 and temperature information representing past temperatures of electrical component 20. Control unit 30 may change a performance characteristic of electrical component 20 based on the supply voltage information and the temperature information. Control unit 30 may determine a reliability margin based on the supply voltage information, the temperature information, and a reliability specification of electrical component 20, and may change the performance characteristic based on the determined reliability margin.

In some embodiments, the acquired temperature information comprises a plurality of past temperatures while, in other embodiments, the temperature information comprise a single value based on a plurality of past temperatures. Similarly, the acquired supply voltage information may comprises a plurality of past supply voltages and/or a single value based on a plurality of past supply voltages. The acquired voltage information might not be represented as a voltage, and, similarly, the acquired temperature information need not be represented as a temperature. Control unit 30 may comprise any combination of hardware and/or software for performing the functions attributed thereto.

Although temperature sensor 22 and voltage sensor 24 are illustrated within component 20 and control unit 30 is shown separate from component 20, embodiments are not limited thereto. For example, all or a portion of control unit 30 may be located within or otherwise mounted on component 20. All or a portion of either or both of sensors 22 and 24 may be located separate from component 20. According to some embodiments, electrical component 20 comprises an integrated circuit die within an integrated circuit package and elements 22, 24 and 30 are mounted within the integrated circuit package. Elements 22, 24 and/or 30 may also be formed within the integrated circuit die.

Figure 2:
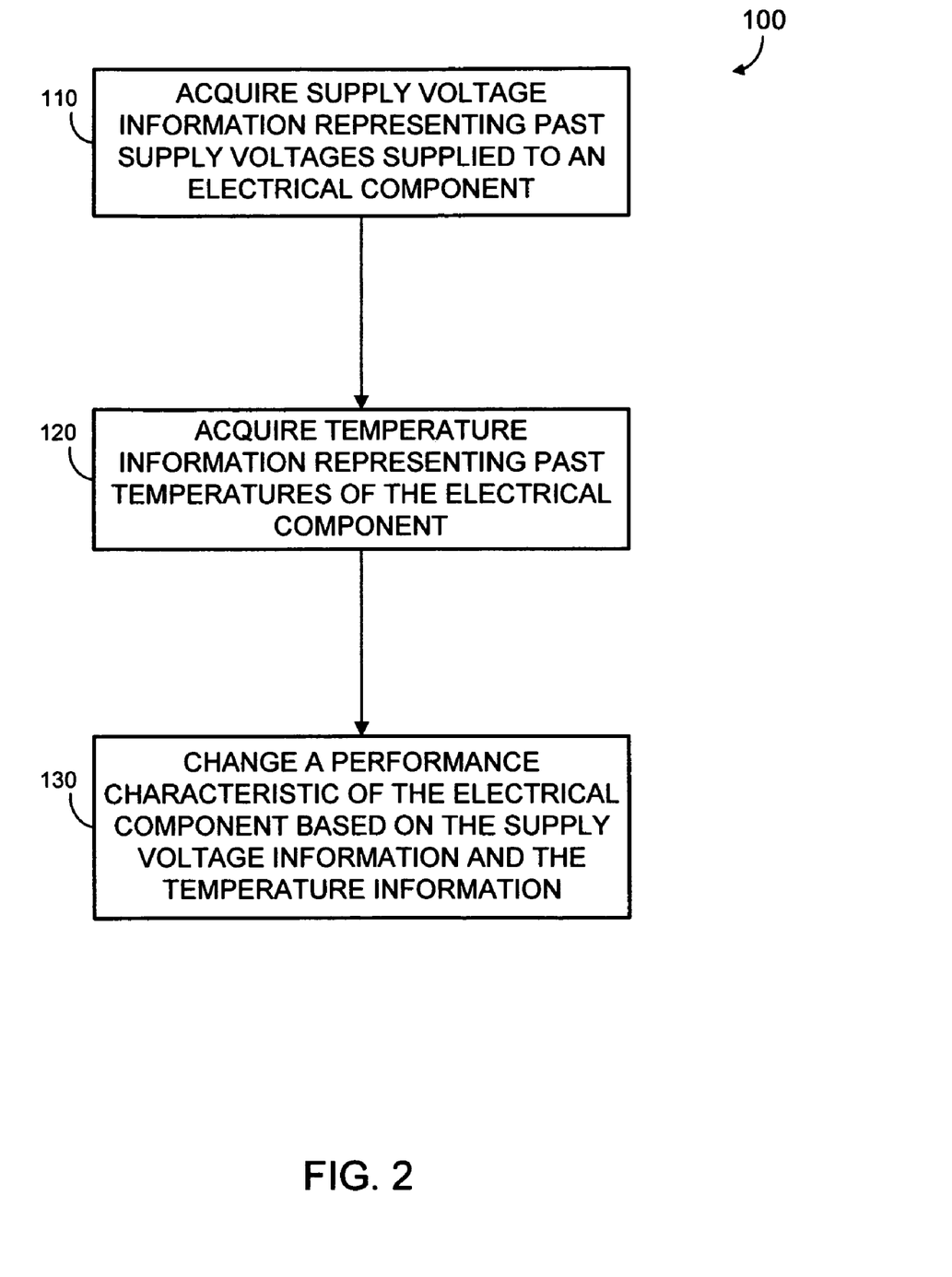
FIG. 2 is a diagram of a process according to some embodiments.

FIG. 2 is a diagram of process 100 according to some embodiments. Process 100 may be executed by apparatus 10 of FIG. 1, but embodiments are not limited thereto. Process 100 may be executed by any combination of hardware and/or software, and some or all of process 100 may be executed manually. In some embodiments, process 100 and/or the other processes described herein are performed by a microcontroller executing program code (e.g., firmware).

Initially, supply voltage information is acquired at 110. The acquired supply voltage information may represent past supply voltages supplied to an electrical component. Turning back to FIG. 1 by way of example, control unit 30 may acquire supply voltage information from voltage sensor 24 at 110. As mentioned above, the acquired supply voltage information may comprise a plurality of past supply voltages and/or a single value based on a plurality of past supply voltages.

Next, at 120, temperature information is acquired that represents past supply voltages supplied to the electrical component. Control unit 30 may acquire the temperature information from temperature sensor 22 at 120. Again, the acquired temperature information may comprise a plurality of past temperatures and/or a single value based on a plurality of past temperatures.

A performance characteristic of the electrical component is then changed at 130. The change may be based on the acquired supply voltage information and temperature information. According to some embodiments, the change may be based on the acquired supply voltage information or temperature information. Generally, control unit 30 may operate alone or in conjunction with one or more elements to change a performance characteristic of component 20 at 130. Several embodiments to change a performance characteristic at 130 will be described in detail below.

One or more of the features described above with respect to FIGS. 1 and 2 may provide improved performance of an electrical component while maintaining a desired and/or prespecified degree of reliability.

Figure 3:
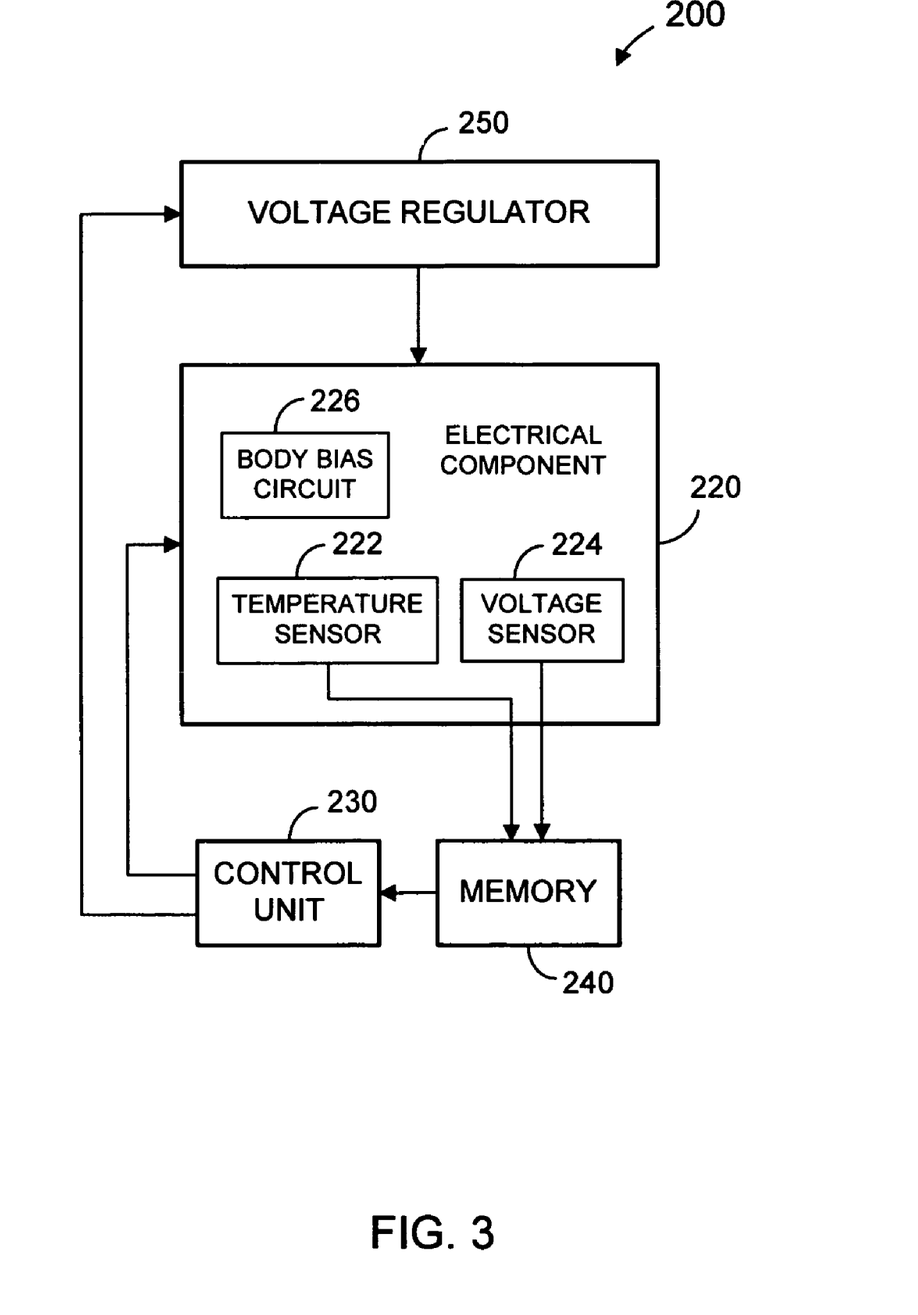
FIG. 3 is a block diagram of an apparatus according to some embodiments.

FIG. 3 is a block diagram of an apparatus according to some embodiments. Apparatus 200 includes electrical component 220, control unit 230, memory 240 and voltage regulator 250. Apparatus 200 may comprise a portion of a computing platform.

Electrical component 220 may comprise any suitable electrical component such as those described above with respect to electrical component 20. Similarly, temperature sensor 222 and voltage sensor 224 may comprise any system for determining a temperature and a supply voltage, respectively, that is or becomes known. According to the illustrated embodiment, temperature sensor 222 determines a plurality of temperatures of electrical component 220, and voltage sensor 224 determines a plurality of supply voltages supplied to electrical component 220. The plurality of temperatures and the plurality of supply voltages are then transmitted to memory 240.

Memory 240 may comprise a non-volatile memory or any other suitable memory type. In some embodiments, memory 240 comprises electronic Random Access Memory. Control unit 230 may access memory 240 to acquire the plurality of temperatures and the plurality of supply voltages.

Control unit 230 may change a performance characteristic of electrical component 220 based on the plurality of temperatures and the plurality of supply voltages. In this regard, control unit 230 may change a frequency of operation of component 220 by instructing body bias circuit 226 to change a body bias voltage of component 220. The changed body bias voltage may change a threshold voltage of switching elements within component 220, thereby allowing a change to a frequency of operation of component 220 for a given supply voltage. Body bias circuit 226 may comprise any suitable circuit to accomplish the foregoing.

Control unit 230 may also or alternatively change a performance characteristic of electrical component 220 by instructing voltage regulator 250 to change a supply voltage supplied to component 220. Voltage regulator 250 may convert a voltage received from a power supply (not shown) to a lower supply voltage for supplying to component 220. Voltage regulator 250 may be implemented as a voltage regulator "module" that is mounted to a substrate that in turn may be coupled to a motherboard of apparatus 200, or as a voltage regulator "down" having elements that are mounted directly on the motherboard, or in any other fashion.

Figure 4:
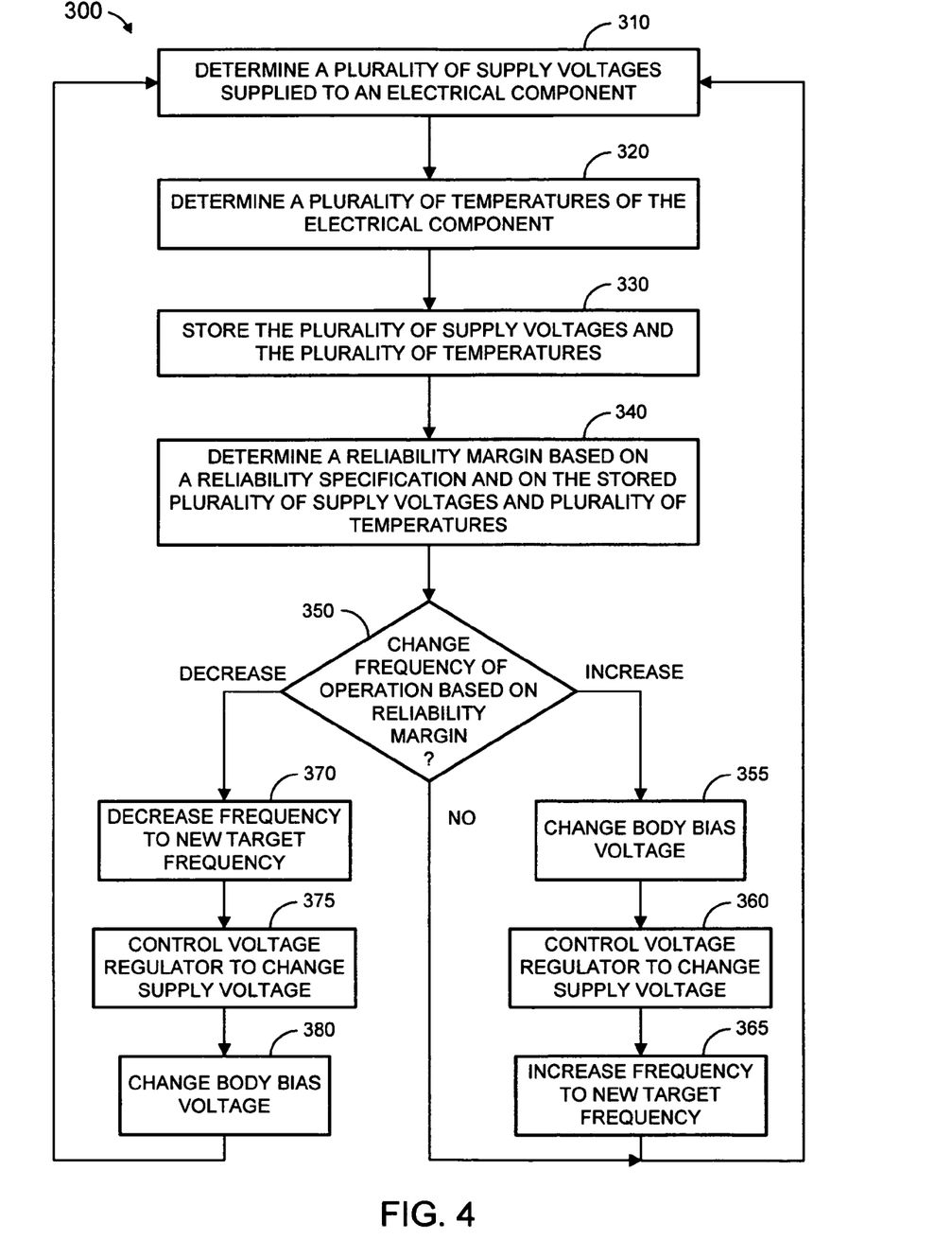
FIG. 4 is a diagram of a process according to some embodiments.

FIG. 4 is a flow diagram of process 300. Process 300 illustrates procedures executed by apparatus 200 according to some embodiments. Although process 300 will be described with respect to apparatus 200, process 300 may be executed by any suitable combination of hardware and/or software.

At 310, a plurality of supply voltages supplied to an electrical component is determined. In the context of apparatus 200, voltage sensor 224 may determine a plurality of supply voltages supplied to electrical component 220 at 310. A plurality of temperatures supplied to the electrical component is then determined at 320. The temperatures may be determined by temperature sensor 222 in some embodiments.

The plurality of temperatures and the plurality of supply voltages are stored at 330. As described above, memory 240 may receive the plurality of temperatures and the plurality of supply voltages from temperature sensor 222 and voltage sensor 224, respectively, and thereafter store the received information.

The plurality of temperatures and the plurality of supply voltages may be determined and stored over time and not necessarily in the sequence indicated in FIG. 4. That is, supply voltages may be determined by voltage sensor 224 at various intervals and/or in response to various events. Similarly, temperatures may be determined by temperature sensor 222 at the same or different intervals and/or in response to the same or other events. The determined supply voltages and temperatures may be stored at any suitable time after they are determined.

Returning to process 300, a reliability margin is determined at 340. The reliability margin is determined based on the plurality of temperatures, the plurality of supply voltages, and on a reliability specification of the electrical component. According to some embodiments, the reliability specification indicates a maximum supply voltage, a maximum temperature, and an operational lifetime associated with the electrical component.

The reliability margin may be determined in any suitable fashion that is or becomes known. In one example of 340, control unit 230 compares the plurality of temperatures against the maximum temperature and the plurality of supply voltages against the maximum supply voltage to determine an extent to which the electrical component's operational life has been depleted. For example, the operational life will have been depleted to a small extent if the electrical component has been in operation for a short time and if its temperature and supply voltage were well below their specified maximum value during the short time.

At 350, it is determined whether a frequency of operation should be changed based on the determined reliability margin. Any formulae, look-up table, or other system may be used in the determination of 350. In some examples, the determination comprises determining if the reliability margin that exceeds a predefined threshold. If it is determined that the frequency should be increased, a body bias voltage of electrical component 220 is changed at 355.

Control unit 230 may instruct body bias circuit 226 at 355 to change a body bias voltage of component 220. The changed body bias voltage may change a threshold voltage of switching elements within component 220, and may thereby allow an increase in the frequency of operation of component 220. Body bias circuit 226 may comprise a body bias generator according to some embodiments.

A voltage regulator is then controlled at 360 to change the supply voltage to further support the increased frequency. Again referring to FIG. 3, control unit 230 may instruct voltage regulator 250 at 360 to change a supply voltage supplied to component 220. The instruction may control voltage regulator 250 to increase the supply voltage to a particular supply voltage.

Next, the current operational frequency of component 220 is increased at 365. The frequency may be increased by changing a multiple in a phase-locked loop that governs the frequency or by any system that is or becomes known.

If it is determined at 350 that the frequency should be decreased, the frequency of component 220 is decreased at 370 using any suitable method. A voltage regulator is then controlled at 375 to change the supply voltage so as to conform to the decreased frequency. In this regard, control unit 230 may instruct voltage regulator 250 at 375 to decrease a supply voltage supplied to component 220. A body bias voltage of electrical component 220 is changed at 380 so as to also support the changed frequency.

Process 300 returns to 310 from 365 or 380. In this manner, the supply voltages and temperatures may be periodically monitored and the frequency of operation may be appropriately changed in response.

Figure 5:
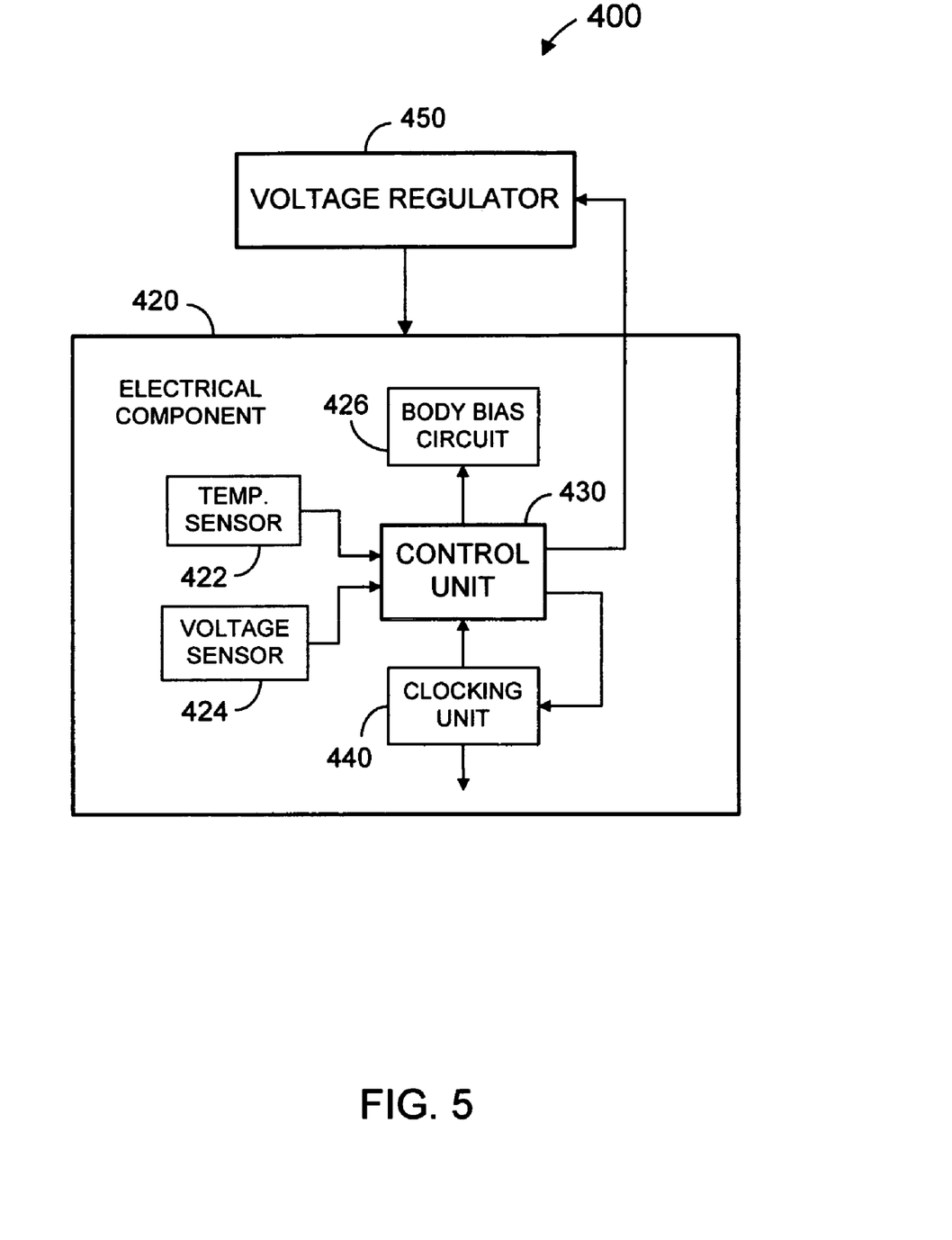
FIG. 5 is a block diagram of an apparatus according to some embodiments.

FIG. 5 is a block diagram of an apparatus according to some embodiments. Apparatus 400 includes electrical component 420, control unit 430, clocking unit 440 and voltage regulator 450. Apparatus 400 may comprise a portion of a computing platform.

Electrical component 420, temperature sensor 422, voltage sensor 424 and body bias circuit 426 may comprise any suitable components for providing the functions described below. Temperature sensor 422 may determine a plurality of temperatures of electrical component 420, voltage sensor 424 determines a plurality of supply voltages supplied to electrical component 420, and body bias circuit 426 provides a controllable body bias voltage to semiconductor devices of component 420. The plurality of temperatures and the plurality of supply voltages are received by control unit 430.

Control unit 430 acquires a single value based on the plurality of temperatures and a second single value based on the plurality of supply voltages. Control unit 430 may also determine a supply voltage and a frequency of operation based on the single value and on the second single value. In view of the determined frequency of operation, control unit 430 may transmit an instruction to clocking unit 440 to change a frequency of operation (e.g., a clock speed) of electrical component 420, and may control body bias circuit 426 to change a body bias voltage. Control unit 430 may also or alternatively transmit an instruction to voltage regulator 450 to change a supply voltage supplied to electrical component 420.

Figure 6:
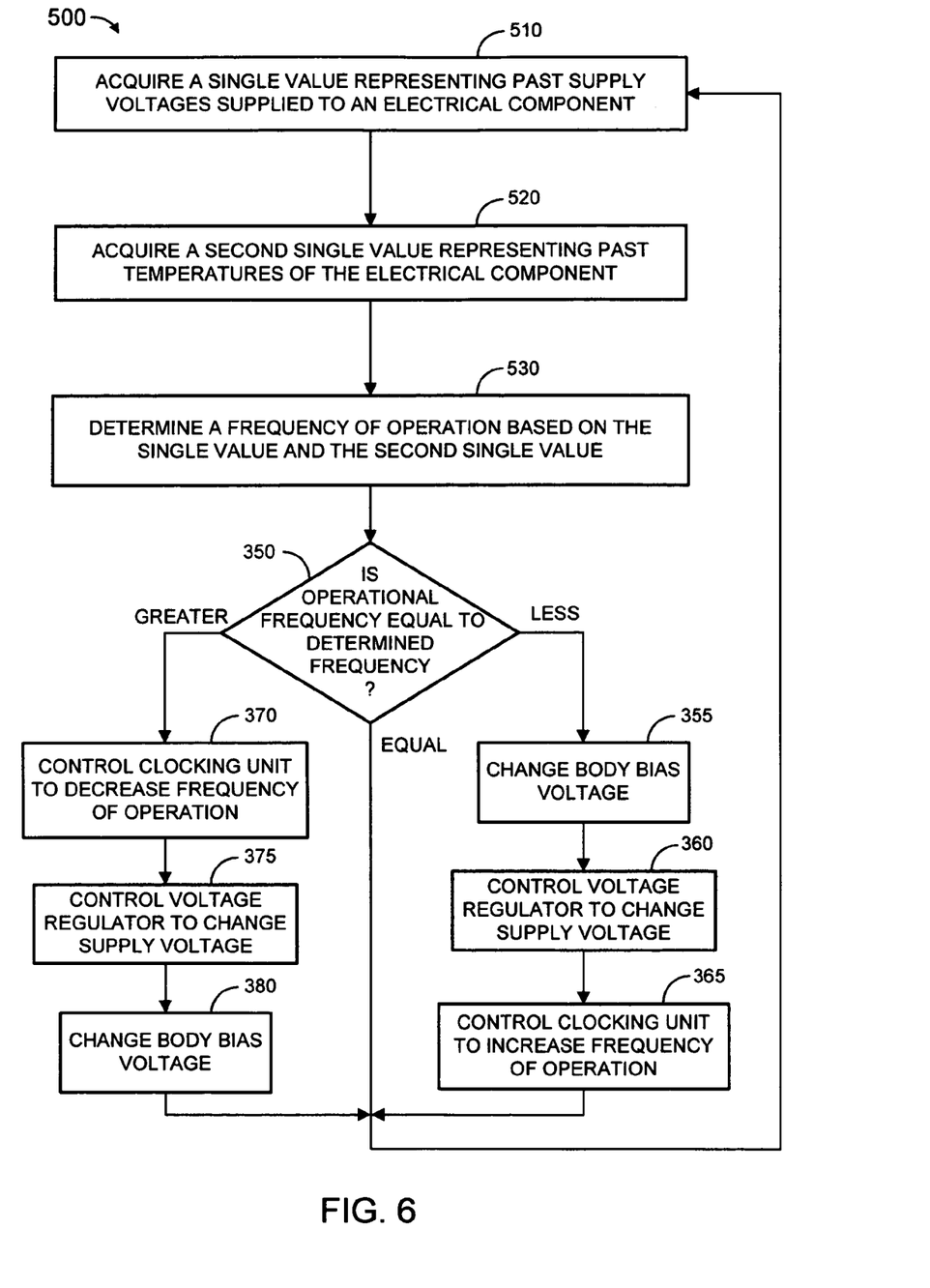
FIG. 6 is a diagram of a process according to some embodiments.

FIG. 6 is a flow diagram of process 500 that may be executed by apparatus 400 according to some embodiments. Of course, process 500 may be executed by any suitable combination of hardware and/or software.

Initially, at 510, a single value is acquired. The single value represents past supply voltages supplied to an electrical component. Taking apparatus 400 as an example, voltage sensor 424 may determine a plurality of supply voltages supplied over time to electrical component 420. The plurality of supply voltages is transmitted to control unit 430, which acquires the aforementioned single value based thereon.

Figure 7:
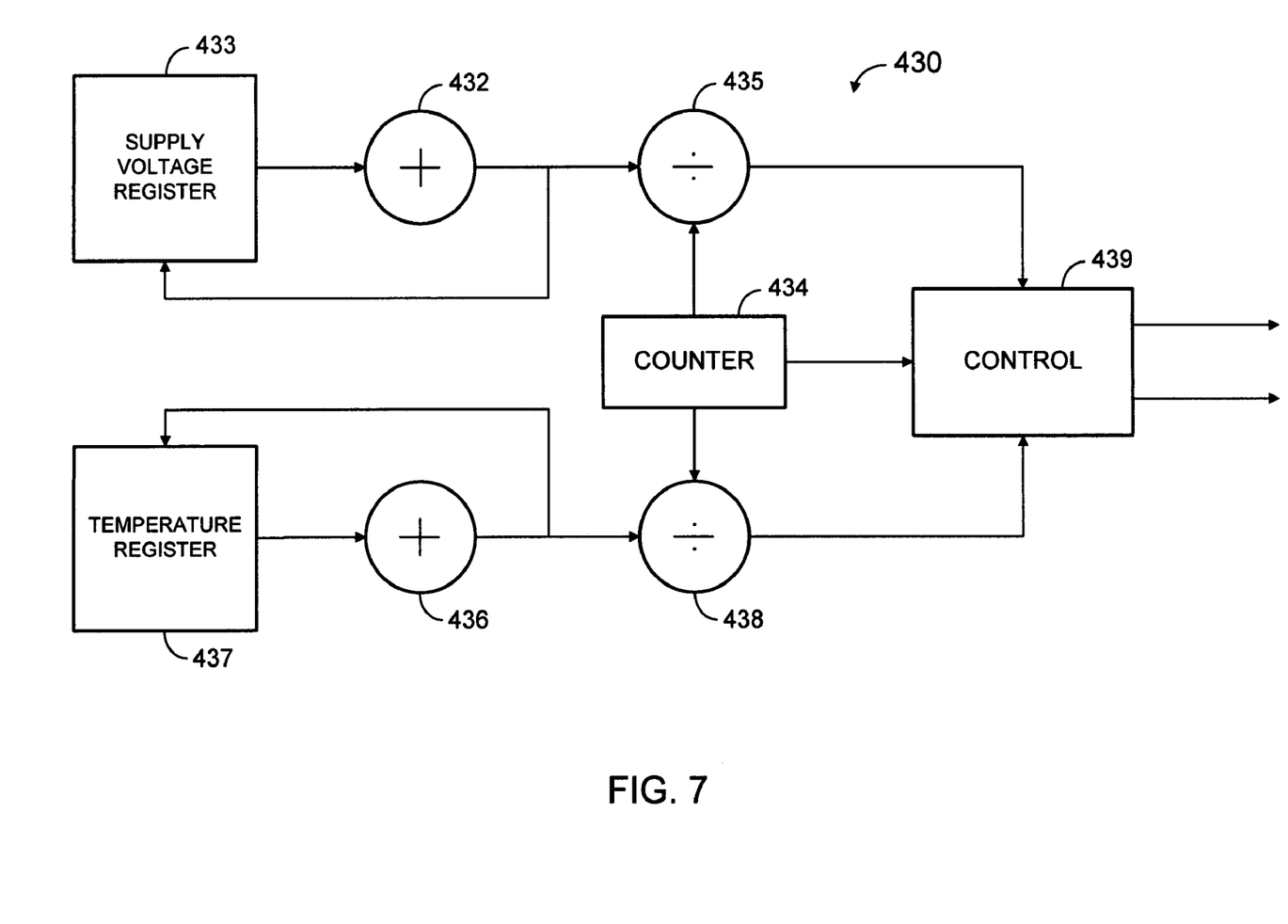
FIG. 7 is a schematic diagram of a control unit according to some embodiments.

FIG. 7 is a block diagram of control unit 430 for explaining 510 according to some embodiments. As shown, additive element 432 receives the determined supply voltages from voltage sensor 424. A received supply voltage is stored in supply voltage register 433, a next received voltage is added thereto, and the sum stored in register 433. Accordingly, register 433 maintains a sum of received supply voltages.

Counter 434 is incremented for each received supply voltage. Quotient element 435 may therefore divide the value stored in register 433 by the value of counter 434 to generate an average value of the received supply voltages. This average value is passed to control 439, and comprises the single value acquired in 510 according to some embodiments.

Returning to process 500, a second single value is then acquired at 520. The second single value represents past temperatures supplied to the electrical component. In some examples, temperature sensor 422 determines, over time, a plurality of temperatures of electrical component 420. The temperatures are transmitted to control unit 430.

Additive element 436 of control unit 430 may receive the temperatures from temperature sensor 422. A first received temperature is stored in temperature register 437, a next received temperature is added thereto, and the sum stored in register 437. Accordingly, register 437 maintains a sum of received temperatures.

Each received temperature causes counter 434 to increment. Quotient element 438 therefore divides the value stored in register 437 by the value of counter 434 to generate an average value of all received temperatures. This average temperature value comprises the single value acquired in 520 and is passed to control 439 according to some embodiments.

A frequency of operation is determined at 530 based on the single value and the second single value. The determination at 530 may proceed in any suitable fashion that is or becomes known. According to some examples, control 439 may refer at 530 to a lookup table that associates average supply voltage values and average temperature values with desired frequencies of operation. The associations within the lookup table may take into account a reliability specification of electrical component 420. That is, a first lookup table for a first electrical component may output a first frequency based on an average supply voltage and an average temperature, while a second lookup table for a second electrical component may output a different frequency based on the same average supply voltage and the same average temperature.

At 540, it is determined whether the current operational frequency of component 420 is less than, equal to, or more than the determined frequency. A body bias voltage of electrical component 420 is changed at 545 if it is determined that the operational frequency is less than the determined frequency. Control unit 430 may instruct body bias circuit 426 to change a body bias voltage of component 420 at 545. As described above, the changed body bias voltage may allow an increase in the frequency of operation of component 420.

A voltage regulator is controlled at 550 to change the supply voltage to further support the increased frequency. Control unit 430 may instruct voltage regulator 450 at 550 to increase the supply voltage to a particular supply voltage. A clocking circuit is controlled at 555 to increase the frequency of operation. Again referring to the FIG. 5 example, control unit 430 may instruct clocking unit 440 at 555 to increase the operational frequency of component 420.

If it is determined at 540 that the operational frequency is greater then the determined frequency, the frequency of component 420 may be decreased at 560 by transmitting an instruction to clocking unit 440. A voltage regulator such as voltage regulator 450 is then controlled at 565 to change the supply voltage so as to conform to the decreased frequency. A body bias voltage of electrical component 420 may then be changed at 570 so as to also support the decreased frequency.

Process 500 returns to 510 after 550, 570 and also in a case that the current and operational frequencies are determined to be equal at 540. The supply voltages and temperatures may thereby be monitored and the frequency of operation may be appropriately changed in response.

Figure 8:
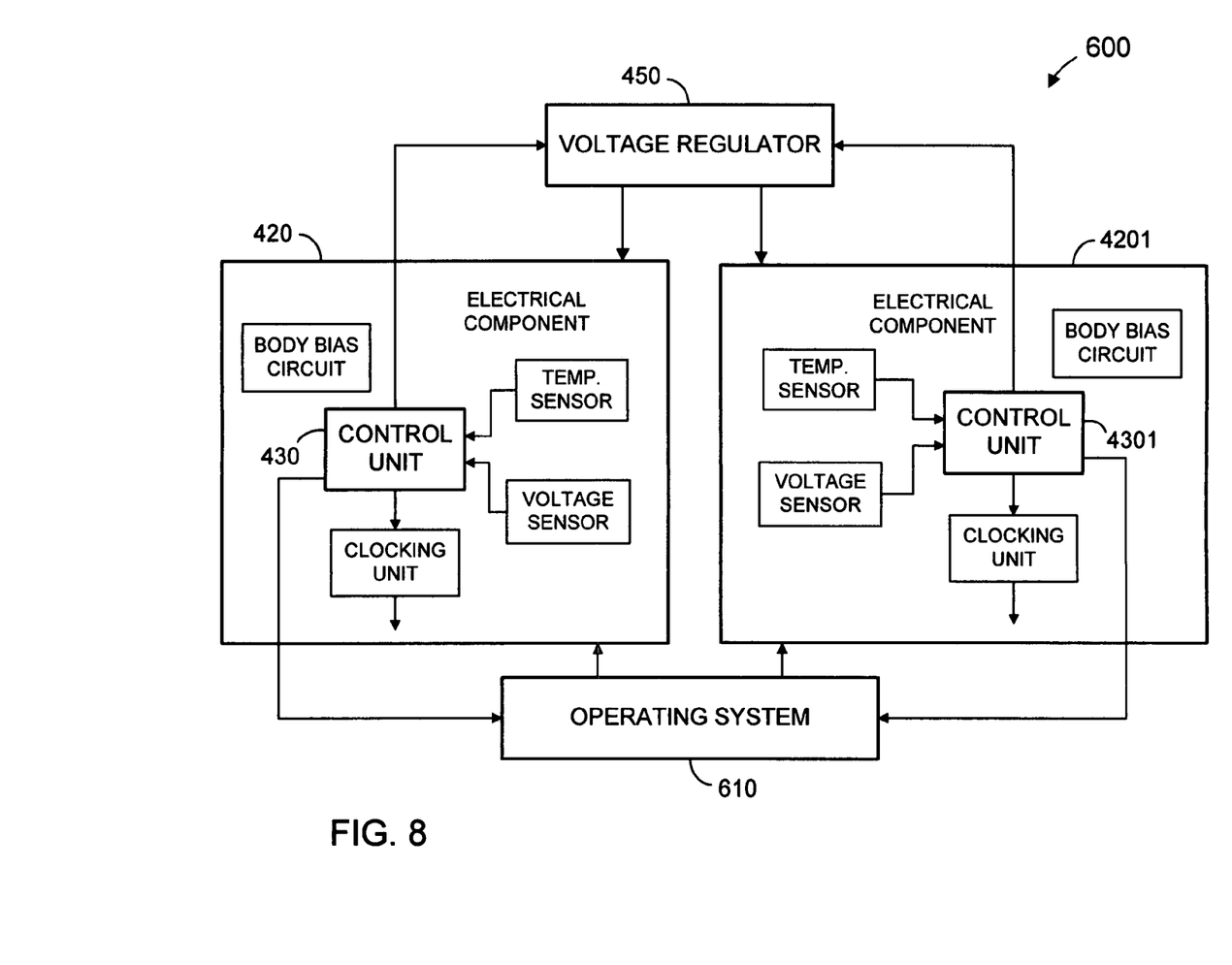
FIG. 8 is a block diagram of an apparatus according to some embodiments.

FIG. 8 is a block diagram of apparatus 600 according to some embodiments. Apparatus 600 may operate to change a frequency of operation, a supply voltage, and/or a workload of an electrical component based on supply voltage information and temperature information.

Apparatus 600 comprises electrical component 420 of FIG. 5 and electrical component 4201. The elements of electrical component 4201 are intended to function as described above with respect to similarly-named elements of component 420, although implementations thereof may differ. Electrical component 4201 may be identical to or different from component 420.

Both of electrical components 420 and 4201 may operate as described above with respect to process 500. However, control units 430 and 4301 may also transmit information based on respective supply voltages and temperatures to operating system 610 of apparatus 600. Operating system 610 may, in turn, change a workload (e.g., a distribution or allocation of tasks) of one or both of components 420 and 4201 based on the information. In one example, operating system 610 delegates a greater percentage of tasks to component 420 and a lesser percentage to component 4201. The ability to reduce or increase the workload of an electrical component may provide another tool for managing its reliability.

Figure 9:
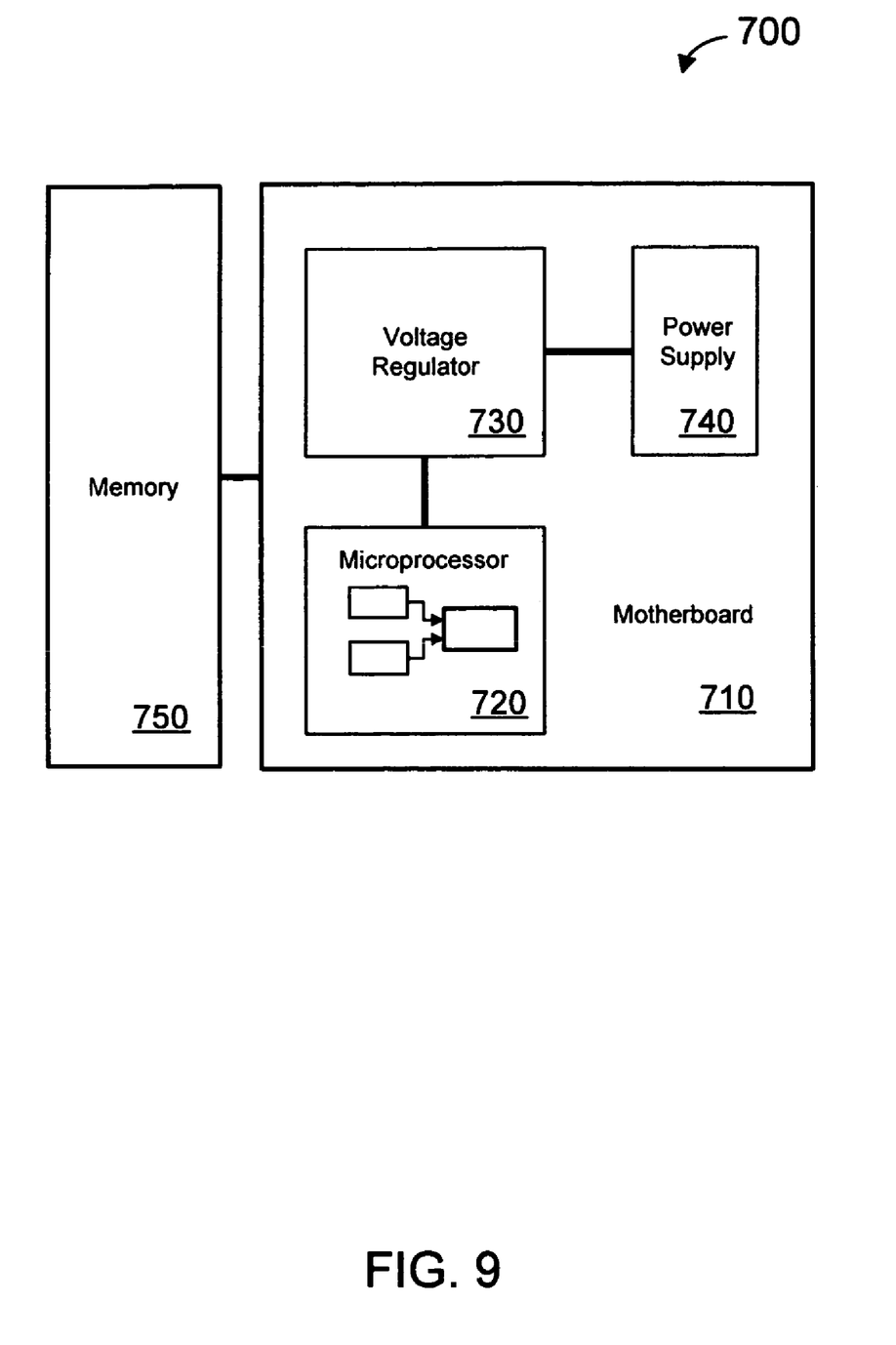
FIG. 9 is a block diagram of a system according to some embodiments.

FIG. 9 illustrates a system according to some embodiments. System 700 may embody any of the implementations and/or processes mentioned above. System 700 includes motherboard 710, microprocessor 720, voltage regulator 730, power supply 740, and memory 750. Voltage regulator 730 receives DC power from power supply 740 and regulates the DC power to provide a supply voltage to microprocessor 720.

Motherboard 710 may route I/O signals between microprocessor 720 and memory 750. Memory 750 may comprise any type of memory for storing data, such as a Single Data Rate Random Access Memory, a Double Data Rate Random Access Memory, or a Programmable Read Only Memory.

The several embodiments described herein are solely for the purpose of illustration. Some embodiments may include any currently or hereafter-known versions of the elements described herein. Therefore, persons in the art will recognize from this description that other embodiments may be practiced with various modifications and alterations.

What is claimed is:

1. A method comprising:
    acquiring supply voltage information representing past supply voltages supplied to an electrical component;
    acquiring temperature information representing past temperatures of the electrical component;
    changing a performance characteristic of the electrical component based on the supply voltage information and the temperature information; and
    determining a reliability margin based on the supply voltage information, the temperature information, and on a reliability specification of the electrical component;
    wherein the performance characteristic is changed based on the reliability margin; and
    wherein determining the reliability margin comprises determining an extent to which an operational life of the electrical component has been depleted.

2. A method according to claim 1, wherein the performance characteristic comprises at least one of a frequency of operation, a body bias, a supply voltage, or a workload.

3. A method according to claim 1, wherein the supply voltage information comprises a plurality of past supply voltages, and
    wherein the temperature information comprises a plurality of past temperatures.

4. A method according to claim 3, wherein determining an extent to which an operational life of the electrical component has been depleted comprises:
    comparing the plurality of past temperatures against a maximum temperature and the plurality of past supply voltages against a maximum supply voltage to determine the extent to which the operational life of the electrical component has been depleted.

5. A method according to claim 1, wherein the supply voltage information comprises a single value based on a plurality of past supply voltages; and
    wherein the temperature information comprises a second single value based on a plurality of past temperatures.

6. A method according to claim 1, wherein changing the performance characteristic comprises:
    changing a body bias voltage of the electrical component.

7. A method according to claim 1, wherein changing the performance characteristic comprises:
    controlling a voltage regulator to change a supply voltage supplied to the electrical component.

8. An apparatus comprising:
    a voltage sensor to determine a plurality of supply voltages supplied to an electrical component;
    a temperature sensor to determine a plurality of temperatures of the electrical component; and
    a control unit to change a performance characteristic of the electrical component based on the plurality of supply voltages and the plurality of temperatures;
    the control unit to determine an extent to which an operational life of the electrical component has been depleted.

9. An apparatus according to claim 8, wherein the performance characteristic comprises at least one of a frequency of operation, a body bias, a supply voltage, or a workload.

10. An apparatus according to claim 8, further comprising:
    a memory to store the plurality of supply voltages and the plurality of temperatures from the temperature sensor, and to provide the plurality of supply voltages and the plurality of temperatures to the control unit.

11. An apparatus according to claim 8, the control unit to change the performance characteristic based on a single value representing the plurality of supply voltages, and on a second single value representing the plurality of temperatures.

12. An apparatus according to claim 8, the control unit to determine a reliability margin based on the plurality of supply voltages, the plurality of temperatures, and on a reliability specification of the electrical component, and to change the performance characteristic based on the reliability margin.

13. An apparatus according to claim 8, further comprising:
    a body bias circuit coupled to the control unit, the body bias circuit to receive an instruction from the control unit to change a body bias voltage of the electrical component.

14. An apparatus according to claim 8, further comprising:
    a voltage regulator coupled to the control unit, the voltage regulator to receive an instruction from the control unit to change a supply voltage supplied to the electrical component.

15. An apparatus according to claim 8, further comprising:
    a clocking unit coupled to the control unit, the clocking unit to receive an instruction from the control unit to change a frequency of operation of the electrical component.

16. A system comprising:
    a microprocessor comprising:
        a voltage sensor to determine a plurality of supply voltages supplied to the microprocessor;
        a temperature sensor to determine a plurality of temperatures of the microprocessor; and
        a control unit to change a performance characteristic of the microprocessor based on the plurality of supply voltages and the plurality of temperatures;
        the control unit to determine an extent to which an operational life of the microprocessor has been depleted; and
    a double data rate memory coupled to the microprocessor.

17. A system according to claim 16, wherein the performance characteristic comprises at least one of a frequency of operation, a supply voltage, or a workload.

18. A system according to claim 16, the control unit to determine a reliability margin based on the plurality of supply voltages, the plurality of temperatures, and on a reliability specification of the microprocessor, and to change the performance characteristic based on the reliability margin.

19. A system according to claim 16, further comprising:
a voltage regulator,
wherein the voltage regulator is to receive an instruction from the control unit to change a supply voltage supplied to the microprocessor.

20. A system according to claim 16, the microprocessor further comprising:
a clocking unit coupled to the control unit, the clocking unit to receive an instruction from the control unit to change a frequency of operation of the microprocessor.

21. A medium storing program code, the program code comprising:
code to acquire supply voltage information representing past supply voltages supplied to an electrical component;
code to acquire temperature information representing past temperatures of the electrical component;
code to change a performance characteristic of the electrical component based on the supply voltage information and the temperature information; and
code to determine a reliability margin based on the supply voltage information, the temperature information, and on a reliability specification of the electrical component,
wherein the performance characteristic is changed based on the reliability margin; and
wherein code to determine the reliability margin comprises code to determine an extent to which an operational life of the electrical component has been depleted.

22. A medium according to claim 21, wherein the performance characteristic comprises at least one of a frequency of operation, a body bias, a supply voltage, or a workload.

23. A medium according to claim 21, wherein the code to change the performance characteristic comprises:
code to change a body bias voltage of the electrical component.

24. A medium according to claim 21, wherein the code to change the performance characteristic comprises:
code to control a voltage regulator to change a supply voltage supplied to the electrical component.

* * * * *